(12) United States Patent
Hollar et al.

(10) Patent No.: US 12,445,998 B2
(45) Date of Patent: Oct. 14, 2025

(54) METHODS, SYSTEMS AND COMPUTER PROGRAM PRODUCTS FOR DETERMINING LOCATION OF TAGS IN AN ENVIRONMENT USING MOBILE ANTENNAS

(71) Applicant: Wiser Systems, Inc., Raleigh, NC (US)

(72) Inventors: Seth Edward-Austin Hollar, Raleigh, NC (US); Ryan Michael Tedrick, Raleigh, NC (US)

(73) Assignee: Wiser Systems, Inc., Raleigh, NC (US)

( * ) Notice: Subject to any disclaimer, the term of this patent is extended or adjusted under 35 U.S.C. 154(b) by 0 days.

(21) Appl. No.: 18/506,443

(22) Filed: Nov. 10, 2023

(65) Prior Publication Data

US 2024/0080796 A1 Mar. 7, 2024

Related U.S. Application Data

(63) Continuation of application No. 17/155,406, filed on Jan. 22, 2021, now Pat. No. 11,856,551.

(60) Provisional application No. 62/965,361, filed on Jan. 24, 2020.

(51) Int. Cl.
*H04W 4/40* (2018.01)
*H01Q 5/25* (2015.01)
*H04W 4/02* (2018.01)
*H04W 4/80* (2018.01)
*H04W 24/10* (2009.01)
*H04W 64/00* (2009.01)

(52) U.S. Cl.
CPC .......... *H04W 64/003* (2013.01); *H01Q 5/25* (2015.01); *H04W 4/025* (2013.01); *H04W 4/40* (2018.02); *H04W 4/80* (2018.02); *H04W 24/10* (2013.01)

(58) Field of Classification Search
CPC ............................. H04W 64/003; H04W 8/087
USPC ...................................................... 455/432.1
See application file for complete search history.

(56) References Cited

U.S. PATENT DOCUMENTS 6,600,418 B2 * 7/2003 Francis ................. G06K 17/00
700/229
9,477,938 B1 * 10/2016 Russell ............... G06Q 10/087
10,231,078 B1 * 3/2019 Swart ...................... H04W 4/02
(Continued)

FOREIGN PATENT DOCUMENTS

CN 108650623 A 10/2018

*Primary Examiner* — Qutbuddin Ghulamali
(74) *Attorney, Agent, or Firm* — Stanek Lemon Crouse & Meeks, PA

(57) ABSTRACT

Systems are provided for determining location of tags in an environment. The system includes at least one mobile antenna that moves around the environment. The absolute location associated with the mobile antenna is known and it sends and receives messages including at least one of time of arrival, time of departure, signal strength and angle of arrival. A measurement module performs distance measurement between the at least one mobile antenna and at least one tag in the environment to obtain at least. The distance measurements are associated with at least two locations of mobile antenna. A storage module records the distance measurements at the at least two locations and the at least two locations. A location module computes a location of each of the at least one tags based on the recorded distance measurements at the at least two locations and the recorded locations of the mobile antenna.

18 Claims, 13 Drawing Sheets

(56) References Cited

U.S. PATENT DOCUMENTS

| | | |
|---|---|---|
| 10,462,762 B2 | 10/2019 | Hollar |
| 2018/0067200 A1 | 3/2018 | Cook et al. |
| 2018/0213352 A1 | 7/2018 | Kimura |
| 2018/0288569 A1* | 10/2018 | Wang .................... H04W 4/023 |
| 2018/0294566 A1 | 10/2018 | Hollar et al. |
| 2019/0297462 A1* | 9/2019 | Aljadeff ................. G01S 13/88 |
| 2019/0297489 A1* | 9/2019 | Lei ...................... H04W 64/003 |
| 2021/0243564 A1 | 8/2021 | Hollar .................. G01S 5/0278 |
| 2022/0201644 A1* | 6/2022 | Ivanov ................... H04L 67/52 |

* cited by examiner

METHODS, SYSTEMS AND COMPUTER PROGRAM PRODUCTS FOR DETERMINING LOCATION OF TAGS IN AN ENVIRONMENT USING MOBILE ANTENNAS

CLAIM OF PRIORITY

The present application is a continuation of U.S. application Ser. No. 17/155,406, filed Jan. 22, 2021, which claims priority to U.S. Provisional Application No. 62/965,361, filed on Jan. 24, 2020 entitled Mobile Antenna Device for Single Antenna Multiple Stationary Tag Tracking, the contents of which are hereby incorporated herein by reference as if set forth in their entireties.

FIELD

The present inventive concept relates generally to tracking assets and, more particularly, to tracking assets with mobile antenna devices.

BACKGROUND

In the world of asset tracking, it is common to use radio frequency (RF) technology to determine the location of assets within a facility. Such systems fall within the field of real-time tracking location systems (RTLS). Passive RFID tags are well known, but active RFLD, Bluetooth, wireless fidelity (WiFi), and ultrawide band (UWB) provide the basis for RTLS solutions as well. UWB is known for its accuracy as the technology enables precision timestamping of RF signals.

Knowing precisely where assets are located within a large facility may involve a larger number of RF antennas distributed throughout the facility. The cost of adding these antenna devices and associated cabling can be a big barrier to installation in some instances. For a large yard or warehouse, hundreds of RF antennas may be installed to track a handful of assets. Furthermore, such assets may not be constantly monitored, and location may be updated on a daily basis, which may be more than adequate. For example, this type of system as described herein may be used to adequately track within a storage warehouse where pallets may occasionally be moved around, but are generally stationary.

SUMMARY

Some embodiments of the present inventive concept provide a system for determining location of tags in an environment, the system including at least one mobile antenna that moves around the environment, wherein an absolute location associated with the at least one mobile antenna is known and wherein the at least one mobile antenna sends and receives messages including at least one of time of arrival, time of departure, signal strength and angle of arrival; a measurement module that performs distance measurement between the at least one mobile antenna and at least one tag in the environment to obtain at least, the distance measurements being associated with at least two locations of the at least one mobile antenna; a storage module that records the distance measurements at the at least two locations and the at least two locations; and a location module that computes a location of each of the at least one tags based on the recorded distance measurements at the at least two locations and the recorded at least two locations of the mobile antenna.

Related method and computer program product embodiments are also provided.

DETAILED DESCRIPTION

Figure 1:
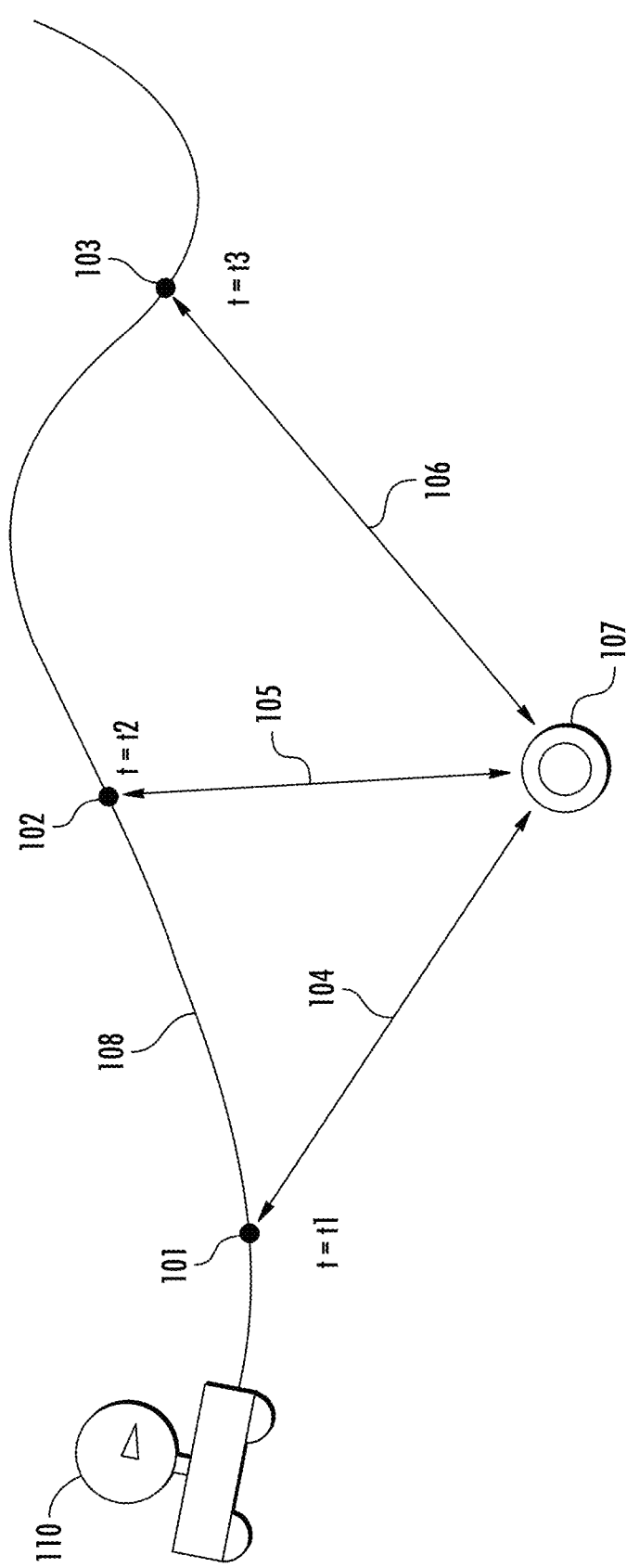
FIG. 1 is a block diagram illustrating a system for tracking relatively stationary assets in accordance with some embodiments of the present inventive concept.

The present inventive concept will be described more fully hereinafter with reference to the accompanying figures, in which embodiments of the inventive concept are shown. This inventive concept may, however, be embodied in many alternate forms and should not be construed as limited to the embodiments set forth herein.

Accordingly, while the inventive concept is susceptible to various modifications and alternative forms, specific embodiments thereof are shown by way of example in the drawings and will herein be described in detail. It should be understood, however, that there is no intent to limit the inventive concept to the particular forms disclosed, but on the contrary, the inventive concept is to cover all modifications, equivalents, and alternatives falling within the spirit and scope of the inventive concept as defined by the claims. Like numbers refer to like elements throughout the description of the figures.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components, but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to another element, there are no intervening elements present. As used herein the term "and/or" includes any and all combinations of one or more of the associated listed items and may be abbreviated as "/".

Unless otherwise defined, all terms (including technical and scientific terms) used herein have the same meaning as commonly understood by one of ordinary skill in the art to which this inventive concept belongs. It will be further understood that terms used herein should be interpreted as having a meaning that is consistent with their meaning in the context of this specification and the relevant art and will not be interpreted in an idealized or overly formal sense unless expressly so defined herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure. Although some of the diagrams include arrows on communication paths to show a primary direction of communication, it is to be understood that communication may occur in the opposite direction to the depicted arrows.

As discussed above, conventional asset tracking systems used to provide precise information as to where assets are located within a large facility may involve a large number of Radio Frequency (RF) antennas distributed throughout the facility. The cost of adding these antenna devices and associated cabling can be a big barrier to installation in some instances. Accordingly, some embodiments of the present inventive concept provide methods and systems for tracking slow or sporadically moving items while drastically reducing the amount of fixed antennas needed within a facility or yard as will be discussed further below with respect to the figures.

As used herein, "assets" refer to items or stock disposed in an environment. The term asset may be used to refer to any item that needs to be tracked. As used herein, "relatively stationary assets" refers to assets in the environment that are not constantly moving. In other words, relatively stationary assets may be moved from one place to another, but these assets are not constantly moving. Finally, as used herein "facility or yard" refers to an environment having assets that may be tracked in accordance with embodiments of the present inventive concept. For example, types of environments may include warehouses, construction yards, office buildings and the like, but environments for use with embodiments of the present inventive concept are not limited thereto.

Referring now to FIG. 1, a diagram of a system for tracking relatively stationary assets in accordance with some embodiments of the present inventive concept will be discussed. As illustrated in FIG. 1, the system includes a mobile antenna 110, a tag 107 and a series of points 101, 102 and 103 that represent a location of the mobile antenna 110 at points in time t1, t2 and t3, respectively. The mobile antenna 110 moves along the trajectory 108 through the points 101, 102 and 103. In particular, the point of the path 101 represents the location of the mobile antenna 110 at time point t1; the point on the path 102 represents the location of the mobile antenna 110 at time point t2; and the point on the path 103 represents the location of the mobile antenna 110 at time point t3. The tag 107 has an unknown location within the environment. As the mobile antenna 110 traverses the trajectory/path 108, it communicates with the tag 107 at points 101, 102, and 103 respectively. The mobile antenna 110 and the tag 107 exchange messages, for example, RF messages, to determine an instantaneous distance between the tag 107 and the mobile antenna 110 at the three different points 101, 102, and 103, yielding measured distances of 104, 105, and 106, respectively.

In some embodiments, the mobile antenna 110 may include (1) a transceiver, for example, an RF transceiver, to perform distance measurements with the tag 107; (2) a mobility means such that it can move between different locations at different times; and (3) location awareness as the time distance measurements are performed. The mobile antenna 110 of FIG. 1 is illustrated has having wheels to provide the mobility, however, embodiments of the present inventive concept are not limited thereto. Distance measurements can be performed using the RF transceiver through a combination of factors including received signal strength and arrival and departure timestamps. An ultra-wideband (UWB) transceiver may provide precise time keeping in such that time of flight (ToF) measurements can be used to calculate distance.

As discussed above, mobility of the mobile antenna 110 may be provided using many different methods. For example, in some embodiments, a means for making the antenna mobile could include an aerial drone, either autonomously guided or manually guided. In further embodiments, a ground vehicle may be used. For example, personnel, for example, a security guard in a cart may scout an area continuously over time or an autonomous ground vehicle could be used in which the system can dynamically determine the route based on tag locations and the update rates. In still further embodiments, the mobile antenna 110 could be positioned in a portable electronic device, such as a smart phone that is carried around by someone in the environment. The mobile antenna 110 may be attached to a mobile robot, for example, an autonomous vacuum cleaner without departing from the scope of the present inventive concept. Further methods of providing mobility include a city maintenance truck; a robot with wheels; a backpack that someone carries around; a forklift; a crane or other mobile infrastructure in a warehouse; and the like. It will be understood that any method may be used to move the mobile antenna 110 around the environment and, therefore, the methods are not limited to those discussed herein.

Any tag may be used for the tag 107 that provides the necessary functionality. For example, relevant tags are discussed in U.S. patent application Ser. No. 15/767,498 entitled ULTRA-WIDEBAND (UWB) ANTENNAS AND RELATED ENCLOSURES FOR THE UWB ANTENNAS, the contents of which are hereby incorporated herein by reference as if set forth in its entirety. Embodiments discussed herein are not limited to this example.

Figure 2:
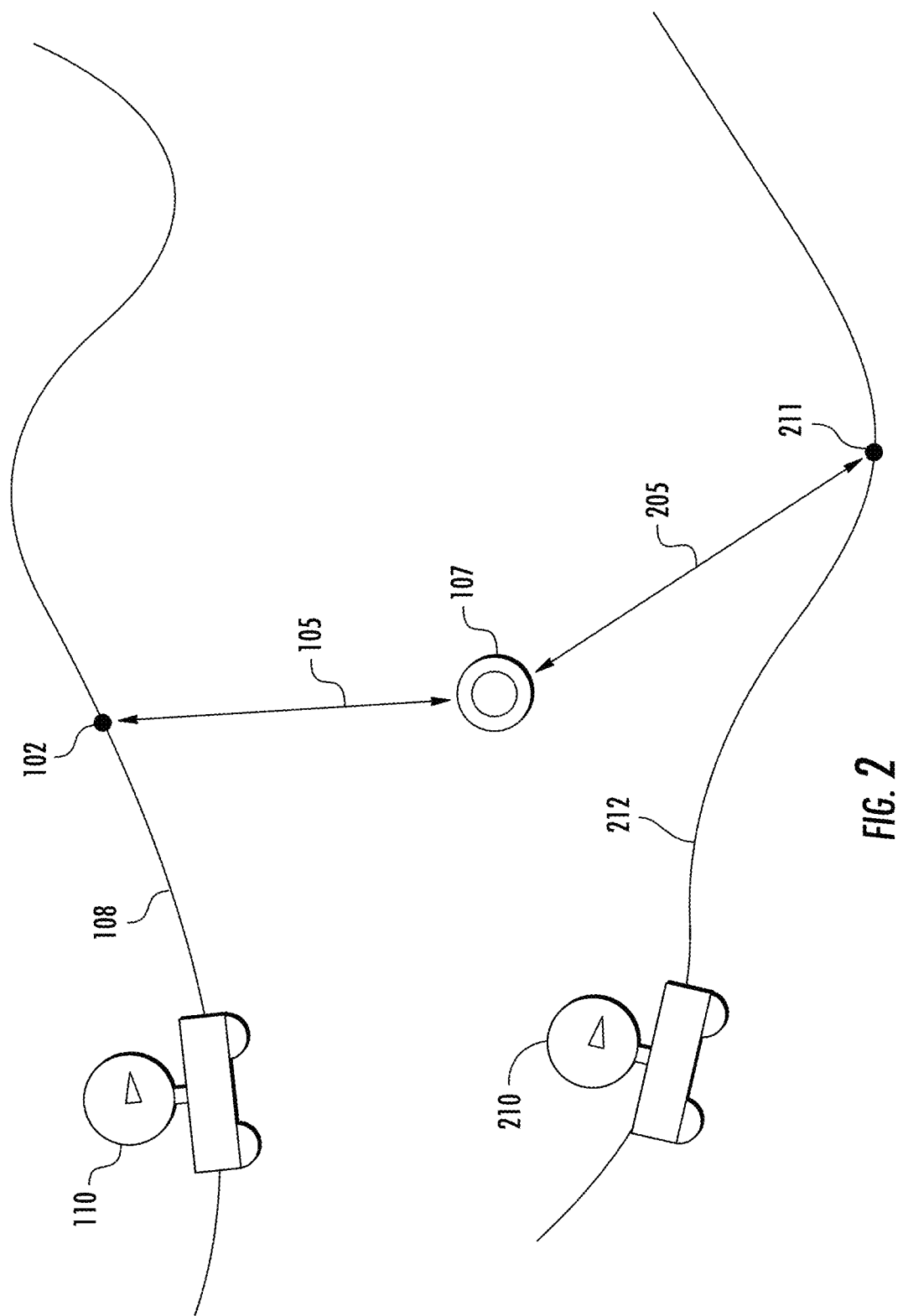
FIG. 2 is a block diagram of a system including multiple mobile antennas in accordance with some embodiments of the present inventive concept.

Referring now to FIG. 2, a system including multiple mobile antennas in accordance with some embodiments of the present inventive concept will be discussed. As illustrated in FIG. 2, the system includes a plurality of mobile antennas 110 and 210, two paths 108 and 212 and a tag 107. The plurality of mobile antennas 110 and 210 are used together to determine the unknown location of the tag 107. The two mobile antennas, 110 and 210, follow paths 108 and 212, respectively. When the mobile antenna 110 traverses point 102 on the path 108, it performs a distance measurement with the tag 107 yielding a distance of 105. Similarly, when mobile antenna 210 traverses point 211, it also performs a distance measurement with the tag 107 yielding a distance of 205. With knowledge of the mobile antennas' locations 102 and 211 and the distances of 105 and 205, a location of the tag 107 can be determined. It will be understood that although FIG. 2 illustrates two mobile antennas 110 and 210, embodiments of the present inventive concept are not limited to just mobile antennas. Similarly, although only two points of measurement 102 and 211 are discussed embodiments of the present inventive concept are not limited to just two. Two or more mobile antennas and measurements may be used without departing from the scope of the present inventive concept.

Figure 3:
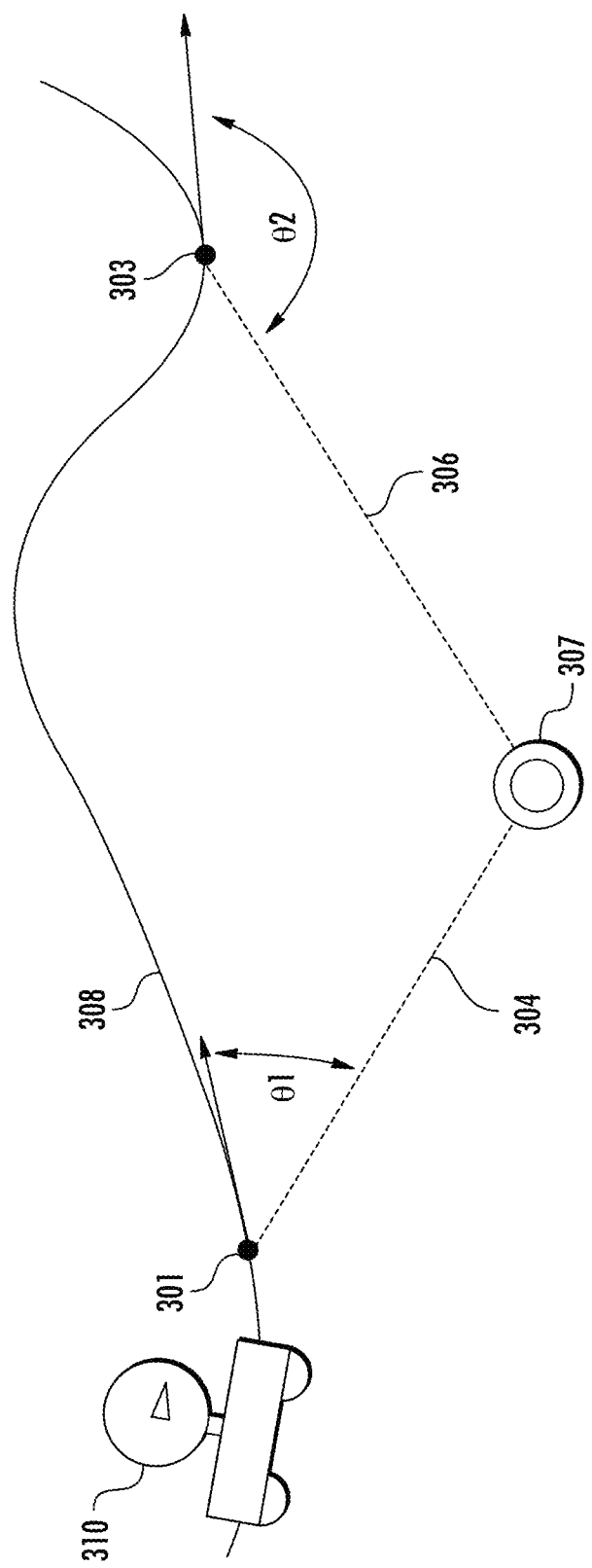
FIG. 3 is a block diagram illustrating a system including mobile antennas having sensing capability in accordance with some embodiments of the present inventive concept.

Referring now to FIG. 3, a system including mobile antennas having sensing capability in accordance with some embodiments of the present inventive concept will be discussed. In some embodiments, the mobile antennas may have additional sensing capability to determine the Angle-of-Arrival (AoA) (θ) of the incoming signals. FIG. 3 illustrates an example of a scenario where mobile antenna 310 is traversing a path 308 and receives a signal from the tag 307 at two different points in the path, 301 and 303, respectively. At the time of receiving a first signal at point 301, the mobile antenna 310 determines the AoA of the signal to be θ1 at a distance 304 from the tag 307. Similarly, at point 303, the mobile antenna 310 receives a second signal from the tag 307 and determines the AoA of the signal to be θ2 at a distance 306 from the tag 307.

The AoA measurement is considered to be relative to the orientation of the mobile antenna 310 and not the global frame. In order for AoA to provide insight into the location of the tag 307, the orientation of the mobile antenna 310 must be known. Provided that information, two or more AoA measurements at discrete locations can be used to determine the location of the tag 307. In some embodiments, methods for determining the orientation of the mobile antenna 310 may include the addition of a magnetometer that would specify the absolute direction of the Earth's magnetic field.

Time difference of arrival (TDOA) methods for determining location may be used in some embodiments of the present inventive concept. Mobile antennas may have their clocks synchronized with one another. For example, this could be accomplished as discussed in U.S. Pat. No. 10,462,762, entitled METHODS FOR SYNCHRONIZING MULTIPLE DEVICES AND DETERMINING LOCATION BASED ON THE SYNCHRONIZED DEVICES, the contents of which are hereby incorporated herein by reference. In some embodiments, high accuracy clocks, for example, atomic clocks, may be used such that synchronization is maintained for long periods of time.

When the clocks are synchronized, two or more mobile antennas that receive the same signal from a tag will have arrival timestamps using the same "clock units." Location can then be calculated with multiple occurrences of two mobile antennas receiving timestamps for the same transmitted signal from the tag, or alternatively, if three or more mobile antennas receive the same transmitted signal from the tag in a single occurrence and so on.

While the embodiments of the present inventive concept are discussed herein with respect to two-dimensional scenarios, embodiments of the present inventive concept are not limited thereto. For example, embodiments of the present inventive concept can be extended to three-dimensional location determination without departing from the scope of the present inventive concept.

In some embodiments, the tag may send out transmit pings at a periodic rate. For a brief time after the tag transmits the ping, the tag's receiver is turned on to listen for responses. If there is no response, the tag may go to sleep and may not be able to hear RF transmissions. In these embodiments, the mobile antenna may need to perform a distance measurement only when it hears a transmission from the stationary tag and can then respond with messages to calculate the distance. The distance may be calculated, for example, as discussed in U.S. Pat. No. 10,462,762, the contents of which has been incorporated herein by reference above.

In some embodiments, the mobile antenna may communicate with the tag and instruct the tag to turn on the receiver at specific times. These times may correlate with the mobile antenna being at different locations and it being ready to take measurements with the tag. The mobile antenna may be configured to track more than one stationary tag and may regularly scout an area (environment) continuously listening for chirping (transmitting) tags and initiating distance readings with those tags.

In some embodiments, the environment the mobile antenna monitors may be so large that at any one time, the mobile antenna may be out of RF range with some of the stationary tags. However, if it hears a tag, the mobile antenna can instruct the tag to chirp (transmit) again during a time the mobile antenna knows it will be in RF range.

In some embodiments, a means for determining a mobile antenna's location may include a global positioning system (GPS) or differential GPS. Solutions like these provide accuracy from meters to millimeters, which is a wide range. The location accuracy of the mobile antenna could be a predominant factor in the overall stationary tag positioning accuracy.

In some embodiments, a mobile antenna's location may be determined using a vision recognition approach or a Lidar based solution. Simultaneous location and mapping (SLAM) methods may be used on the vehicle itself to determine the position of the mobile antenna as it moves around an environment.

Figure 4:
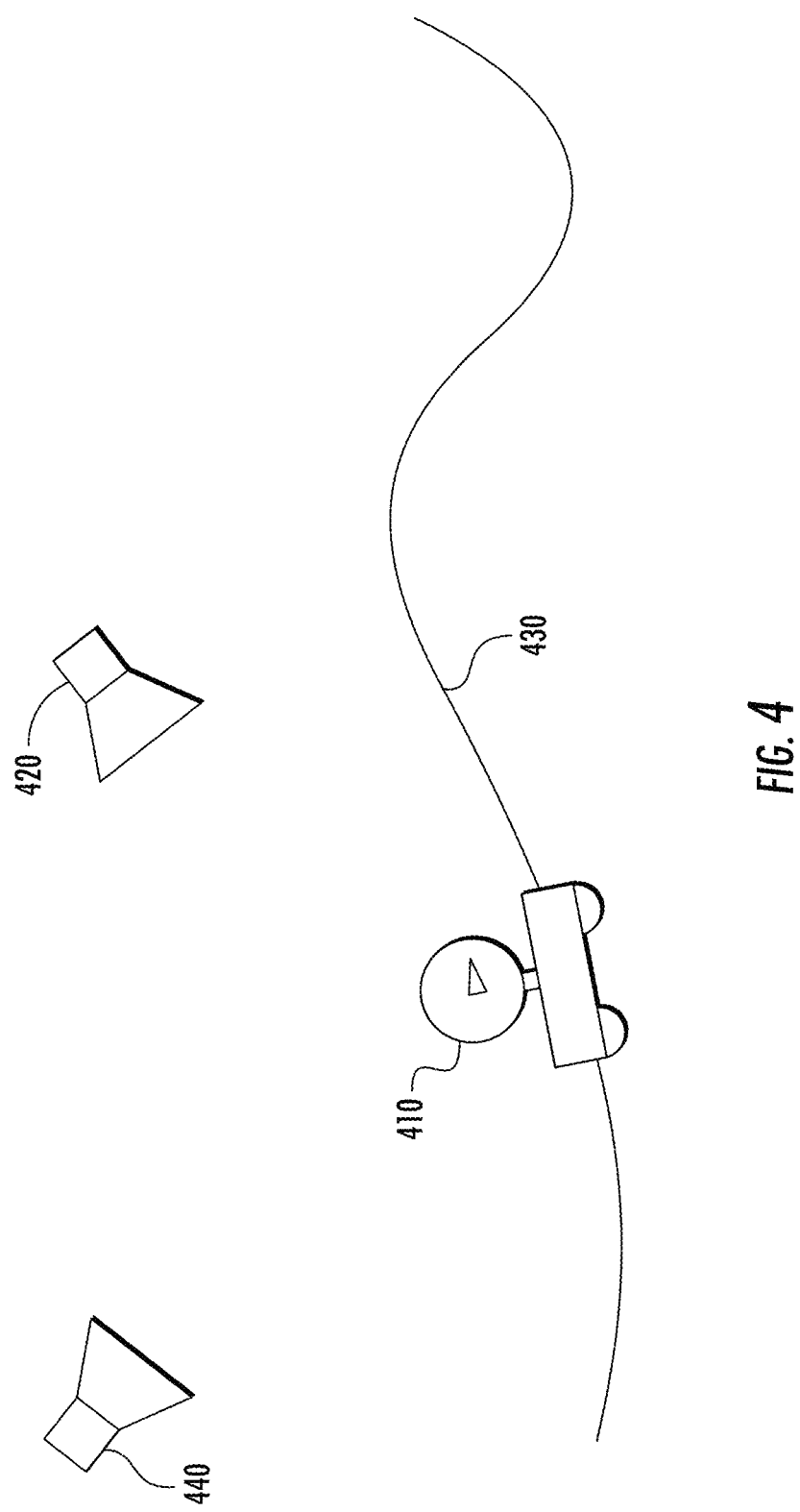
FIG. 4 is a diagram illustrating a system using a vision recognition approach in accordance with some embodiments of the present inventive concept.

Referring now to FIG. 4, a system using a vision recognition approach will be discussed in accordance with some embodiments of the present inventive concept. As illustrated in FIG. 4, the system includes a mobile antenna 410 and a plurality of cameras 420, 440. The mobile antenna 410 follows a path 430 and cameras 420 and 440 are mounted above the path and take video of the mobile antenna 410 as it traverses the path 430. Video processing of the images is performed where the mobile antenna's 410 location within the video image is extracted. Using one or more cameras in this way, the physical location of the mobile antenna 410 can be deduced.

In some embodiments, the mobile antenna may position itself at known locations throughout an environment. For example, passive RFID tags could be embedded at different stations. The mobile antenna could travel to a station with a mobile RFID tag. The mobile antenna could have an RFID proximity reader on it, so that once it was in range, the reader would know the RFID tag was near and the mobile antenna would know its location. The mobile antenna then waits at the station, and over time, it gathers distance data of tags in the environment. Once gathered, the mobile antenna travels to the next station with an RFID tag, and again, gathers distance data of tags in the environment. Operations may continue in this fashion going from one RFID tag station to another. Since the RFID tag locations are known, the location of the stationary tags can be determined.

In some embodiments, the mobile antennas may not have to be prescribed by the tracking system. These mobile antennas may simply move in a way that may or may not be coordinated with the capturing of tag data. For example, if the mobile antenna were incorporated into a smart phone and a person were carrying it around, the path traversed by the person could be akin to a random walk. The path chosen may not be driven by the goal of optimally capturing tag data, but instead, may depend on external factors out of the control of the tracking system.

Various examples in accordance with embodiments of the present inventive concept in various embodiments will be discussed herein. The first example is based in a warehouse environment. The warehouse is large and includes tagged items throughout the warehouse. A small autonomous mobile robot including a mobile antenna incorporated therein may traverse the warehouse and performs RF ranging to stationary tags whenever they chirp (transmit). The location of the mobile robot is determined using a variety of sensors on the robot. With enough distance data from any one stationary tag, the robot can accurately determine the tags location within the warehouse in accordance with embodiments discussed herein.

Another application may be using a smart phone or portable smart device. In this application, the mobile antenna may be embedded in the portable electronic device (smart phone), and as the user moves around with the portable electronic device, the mobile antenna receives tag information from the stationary tags positioned in the environment. Using the location sensors, for example, GPS, Wi-Fi, near field communication (NFC), Bluetooth, IMU, Magnetometer, Pressure Sensor, and the like, on the portable electronic device, it can deduce its location. Tag location data (TDOA ping, ranging information, and/or AoA) information can be collected by a multiplicity of portable electronic device to calculate location of the individual tags in accordance with embodiments of the present inventive concept discussed herein.

Figure 5:
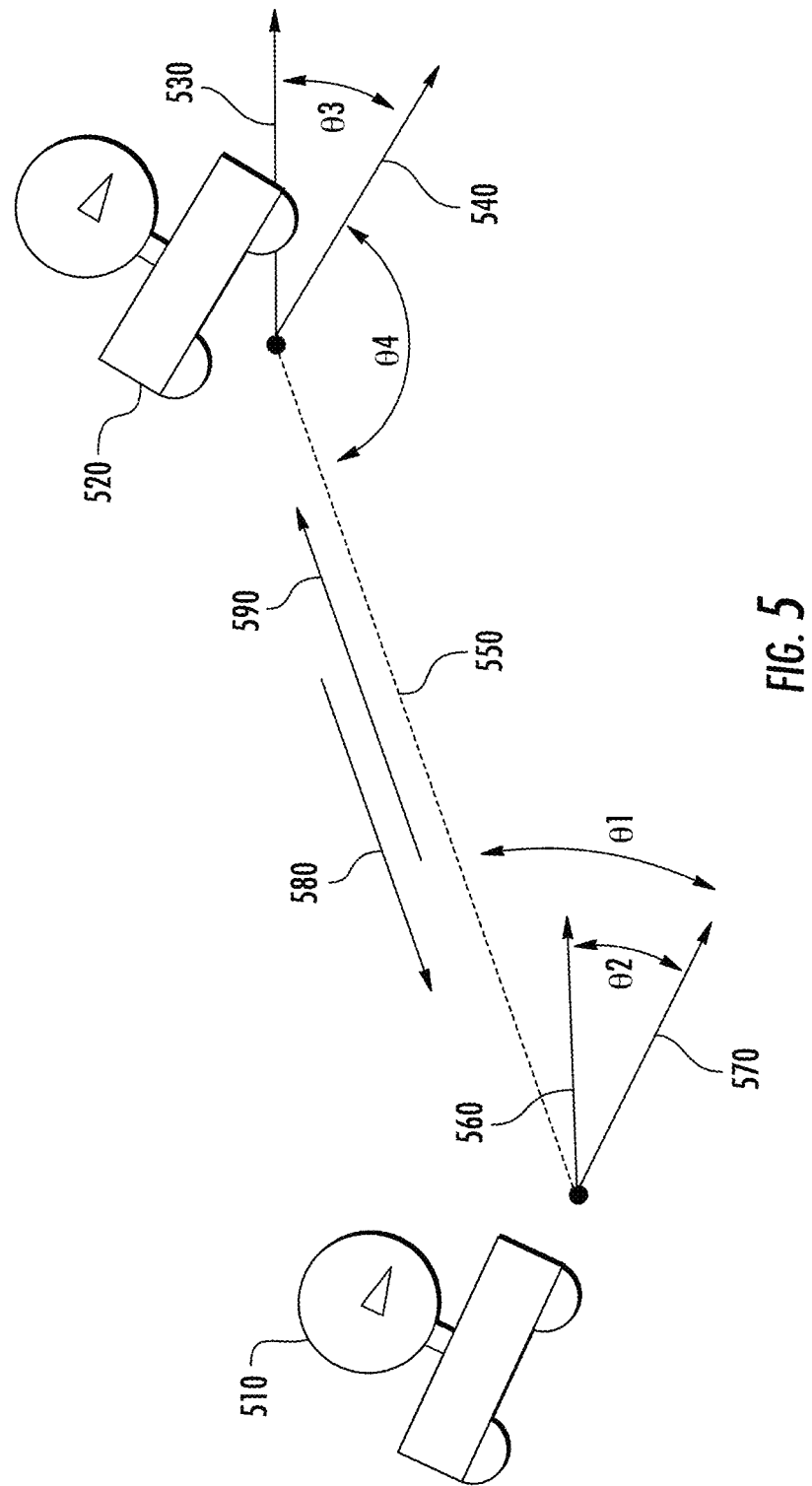
FIG. 5 is a diagram illustrating the use of multiple mobile antennas to determine antenna orientation based on Angle-of-Arrival (AoA) in accordance with some embodiments of the present inventive concept.

As discussed above, UWB based systems allow for the precise determination of an Angle-of-Arrival of an incoming Tag transmission. The AoA value can be used to determine an absolute location of a stationary tag. However, it may only be useful if the mobile antenna's orientation is known relative to an absolute frame of reference. In some embodiments, operations for using one mobile antenna to discern its absolute orientation knowing another antenna's absolute orientation are provided. FIG. 5 illustrates a system having two mobile antennas 510 and 520. There is an absolute frame of reference depicted by global reference vectors 530 and 560. Note that 530 and 560 point in the same direction since they refer to the same reference direction. Mobile antenna 520's orientation is known and is depicted by the angle $\ominus 3$ defined as the angle between the direction of the mobile antenna 540 and the reference vector 530.

Mobile antenna 510's orientation, $\ominus 2$, is defined as the angle between the global reference vector 560 and the mobile antenna 510's direction of orientation 570. Initially, $\ominus 2$ is unknown. Mobile antenna 520 sends mobile antenna 510 a transmission 580. Mobile antenna 510 receives the transmission 580 and determines the AoA $\ominus 1$. Likewise, mobile antenna 510 sends mobile antenna 520 a transmission 590. Mobile antenna 520 receives the transmission 590 and determines the AoA $\ominus 4$. In some embodiments, mobile antenna 510 informs mobile antenna 520 of $\ominus 1$, and as such mobile antenna 520 can learn mobile antenna 510's orientation. In some embodiments, mobile antenna 510 could initiate the communication. Mobile antenna 520 could respond sending AoA measurements $\ominus 3$ and $\ominus 4$, thus allowing mobile antenna 510 to determine its orientation within the global frame. Alternatively, a second communication could send AoA measurements $\ominus 3$ and $\ominus 4$ information from mobile antenna 520 to mobile antenna 510. At this point, mobile antenna 510's orientation $\ominus 2$ can be calculated as a function of $\ominus 1$, $\ominus 3$, and $\ominus 4$ as illustrated in Eqn. (1).

$$\ominus 2 = \ominus 1 + \ominus 3 + \ominus 4 - 180 \qquad \text{Eqn. (1)}$$

where $\ominus 2$ is mobile antenna 510's orientation; $\ominus 1$ is the AoA of transmission 580; $\ominus 3$ is mobile antenna 520's orientation; and $\ominus 4$ is the AoA of transmission 590. In some embodiments, signs of the angles may change, or additional factors may be incorporated without departing from the scope of the present inventive concept.

In a three-dimensional (3D) space, the geometry may be more complicated, but the use of one mobile antenna's known orientation to determine another mobile antenna's orientation through AoA and transmissions remains largely the same.

In some embodiments, it may be assumed that the locations of mobile antennas 520 and 510 are already known in absolute coordinates. In these embodiments, the direction defined by 550 is inherently known as the vector created by the difference of the point locations between the two mobile antennas. In some embodiments, the mobile antenna 520 could be considered a fixed antenna without departing from the method for determining orientation for mobile antenna 510.

Figure 6:
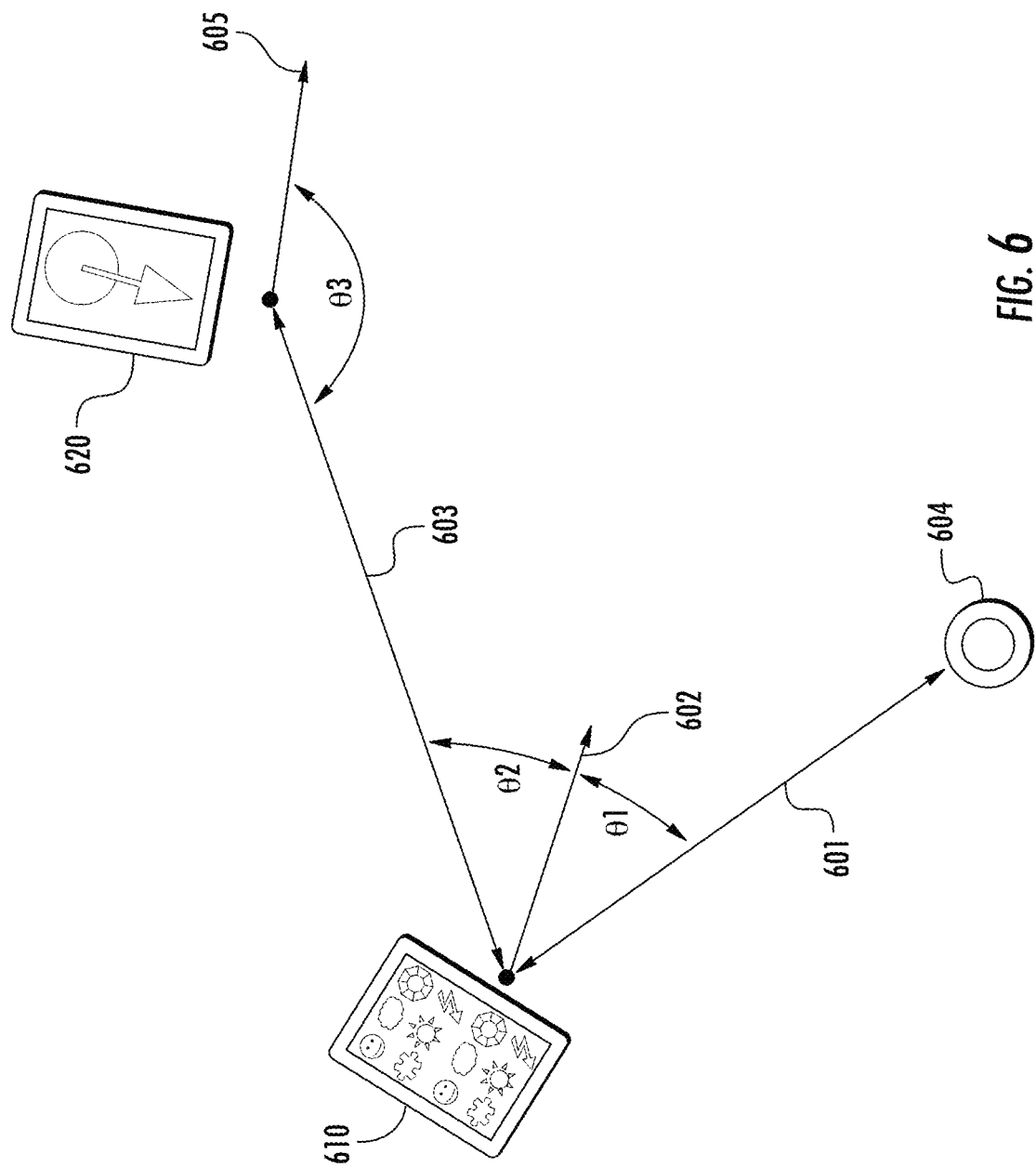
FIG. 6 is a diagram illustrating using mobile antennas to find a tag in accordance with some embodiments of the present inventive concept.

Referring now to FIG. 6, methods using mobile antennas to find a tag in accordance with some embodiments of the present inventive concept will be discussed. As illustrated in FIG. 6, the mobile antennas are provided by portable electronic devices, for example, smart phones, 610 and $\ominus 20$. In embodiments illustrated in FIG. 6, the smart phones 610 and $\ominus 20$ do not need to know their absolute location. An example of how the method may work in actuality will now be discussed. Multiple people with smart phones are in the environment. One person with the smart phone 620 is looking for a tag 604, but his smart phone 620 cannot communicate directly to the tag 604. Another smartphone 610, acting as an intermediary, can communicate both to the tag 604 and to the smartphone 620. As the intermediary, the smart phone 610 performs ranging with the tag 604 to get a distance 601. Furthermore, smart phone 610 determines the AoA of tag 604's transmission during ranging to be $\ominus 1$. Then, smart phone 610 performs ranging with smart phone 620 to get a distance 603. Smart phone 610 determines the AoA of smart phone 620's transmission during ranging to be $\ominus 2$, and smart phone 620 determines the AoA of smart phone 610's transmission to be $\ominus 3$. The distances, 601 and 603 and the AoA measurements of ⊖1, ⊖2, and ⊖3, are either sent to or already reside with smart phone 620. Using geometry, smart phone 620 can calculate both the distance and the direction the tag 604 is in and can display that on the screen of smart phone 620. For example, an arrow may be shown on the screen in the direction of the tag 604.

Although only one intermediary smart phone is shown in FIG. 6, embodiments of the inventive concept can be extrapolated to many smart phones sharing various raw location data to calculate location of tags. Furthermore, although this example discussed above describes a two-dimensional (2D) scenario, three-dimensional (3D) scenarios are also possible in accordance with embodiments of the present inventive concept discussed herein.

It will be understood that although FIG. 6 illustrates the mobile antennas being smart phones, embodiments of the present inventive concept are not limited to this configuration. For example, mobile and stationary antenna devices could be considered as the communicating devices in general without departing from the scope of the inventive concept.

In some embodiments, there may be mobile antenna devices that may flow in and out of an area. For example, in an environment where people carry smart phones with incorporated mobile antennas, like a shopping mall. Before someone gets to the shopping mall, the antenna on their smart phone would be considered out of range, but once they arrive, there is an opportunity for the device to cooperate with other antenna devices in the mall to do cooperative localization. In these embodiments, devices can form ad-hoc networks to work together to locate tags. Antenna devices may be able to join/form a local mesh, and by doing so work together to aid in doing localization both for the mobile antenna devices and for tags.

Figure 7:
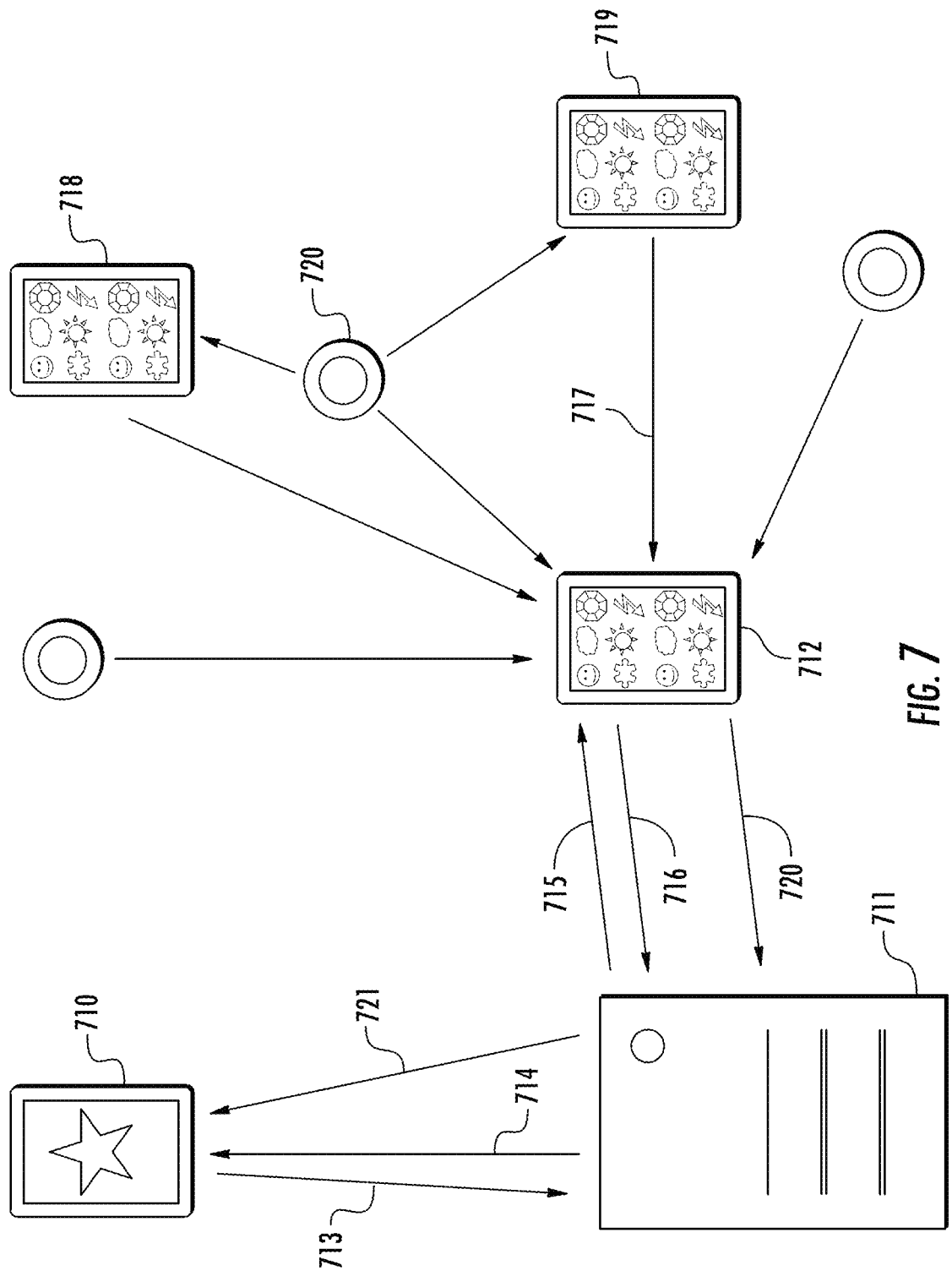
FIG. 7 is a diagram illustrating devices that are not in range of their tags in accordance with some embodiments of the present inventive concept.

In some embodiments, devices may not be in range of their tags as will be discussed with respect to FIG. 7. As illustrated in FIG. 7, the device 710 associated with a tag 720 might not be within communication range. In these embodiments, the device 710 can make a request 713 with a tag data server 711 (discussed further below) for the location of the tag. If the server has this data, it will send a communication 714 to the requesting device 710. If it does not have this data, the server can convey an instruction 715 to other devices to report on the tag's location with specific instructions. For example, other devices can send a transmission 716 to notify the data server that they are in range of various tags 716. The tag data server 711 can instruct the notifying device 712 to construct a local mesh with other devices, 718 and 719 in this example, as the mesh's root node as discussed further below with respect to FIG. 9 and to report on the location of a specific tag, 720. Once this data has been gathered it can be relayed to the device that owns the tag 710 through a variety of means 721.

Figure 8:
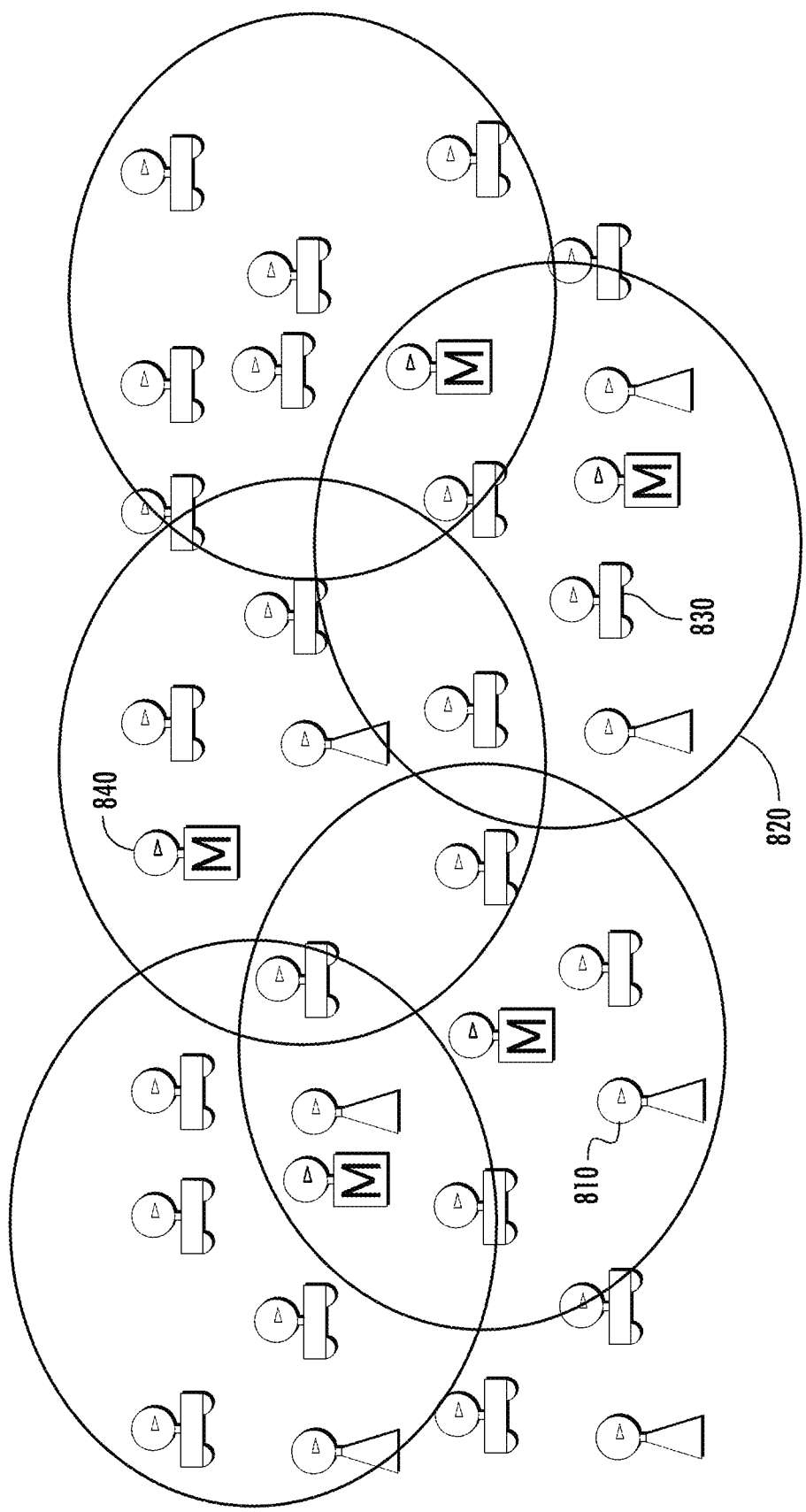
FIG. 8 a diagram illustrating multiple meshes in accordance with some embodiments of the present inventive concept.

Referring now to FIG. 8, a diagram illustrating multiple mesh networks in accordance with some embodiments of the present inventive concept will be discussed. As used herein, a "mesh network" refers to a local network topology in which the infrastructure nodes (i.e. bridges, switches, and other infrastructure devices) connect directly, dynamically and non-hierarchically to as many other nodes as possible and cooperate with one another to efficiently route data from/to clients. More simply, a mesh network is a group of RF capable devices that can communicate with one another either directly or indirectly to efficiently route data and perform localization tasks.

As illustrated in FIG. 8, the mesh networks are denoted by the circles where 820 is one such mesh. All the devices within the mesh are considered part of the mesh. Element 810 represents a stationary antenna device where it is assumed to be immobile. Element 830 represents mobile antenna devices. These mobile devices 830 move around creating the necessity of dynamic mesh formation. Root (or master) device 840 represents the owner of the mesh which will be discussed further herein. It will be understood that an antenna device can belong to more than one mesh without departing from the scope of the present inventive concept. These meshes can also be very fluid and temporal depending on how quickly the mobile devices move around.

Figure 9A:
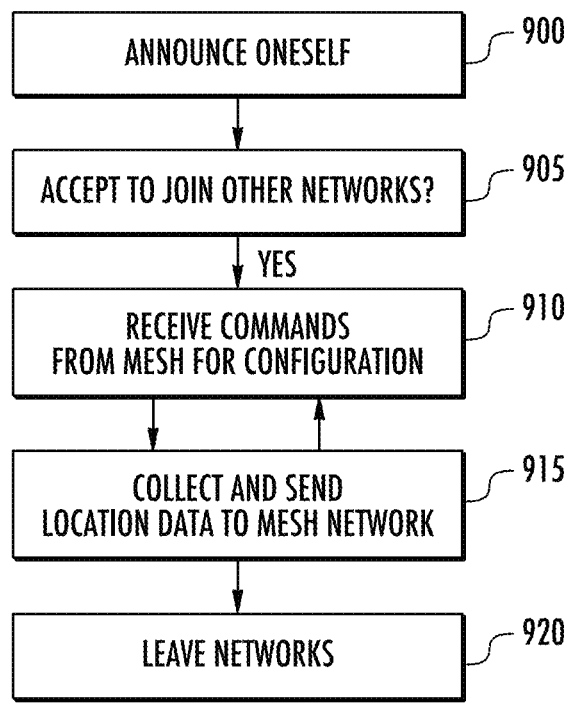
FIG. 9A is a flowchart illustrating operations of joining an existing mobile mesh network in accordance with some embodiments of the present inventive concept.

Referring now to FIG. 9A, a flowchart illustrating operations of forming and joining a mobile mesh network in accordance with some embodiments of the present inventive concept will be discussed. As illustrated in FIG. 9A, operations begin at block 900 by announcing the presence of the antenna device in the environment. In other words, the antenna device may announce its presence using, for example, an RF broadcast message. Essentially, the antenna device advertises that it is present and available to join other networks. It will be understood that there may be some messaging back and forth with other devices to understand the devices capabilities or even its intent to stay in that area and for how long.

The antenna device may receive a request to join a mesh network (block 905). Additional parameters may be included to understand the devices intent on staying in the area, whether it can transfer data, and if it knows of other devices in the area. The device can respond to the request to join by either declining (in which it may end the communication) or by affirming the request. If the request is affirmed, operations proceed to block 910 by receiving commands from the mesh for configuration. The device further communicates with the network to understand how it needs to integrate into the network in order to collect and share data. For example, as a UWB device, it may only want to do RF ranging to determine distance with other antenna devices and tags. Alternatively, the antenna device may need to synchronize its clock with the network itself as discussed in, for example, U.S. Pat. No. 10,462,762, and use TDOA methods for determining tag location. In some embodiments, the antenna device can determine the angle of arrival (AoA) of an incoming tag or other device transmission. Further configuration of the antenna device may include instructions on when and how to transmit. If using the same RF band as others, a protocol may be selected to prevent RF transmission collisions. If a data backhaul link exists, it could send data through Wi-Fi or cellular backhaul.

Once configured, the antenna device collects location data (block 915). In UWB, this could be in the form of arrival and departure timestamps, distance measurements, and/or AoA measurements. This data could be collected and routed through the mesh network to the appropriate recipient. Some processing of the data could also occur on the antenna device itself. For example, the ranging calculation to a tag or another device could occur with the right timestamp information. TDOA calculations could be done on the antenna device should all the arrival timestamp data be available to it. As used herein, "raw data" refers to data that is ultimately used to calculate location. UWB examples of raw data could include arrival and departure timestamps, angle of arrivals, and distances data. Other examples of raw data could include sensor data unrelated to UWB: camera images, IMU, magnetometers, RFID signals, and the like. This raw data may be routed through the mesh network (block 915). The mesh could have a centralized device where all location calculations could occur. Alternatively, the raw data could be sent to a remote server via internet enabled devices. In either embodiment, the raw data is sent to locations where processing can be performed to calculate the location of tags and other devices.

The antenna device has the option to leave the mesh network at some point (block 920). In some embodiments, this may occur by moving out of range of the network. Alternatively, the network itself may choose to drop the antenna device from the mesh depending on the needs of the mesh, itself. A mesh may decide that an antenna device is poorly connected or too far away to be useful in location determination. An antenna device can join one or more mesh networks simultaneously and may find itself sending duplicate data to different endpoints in both networks.

Figure 9B:
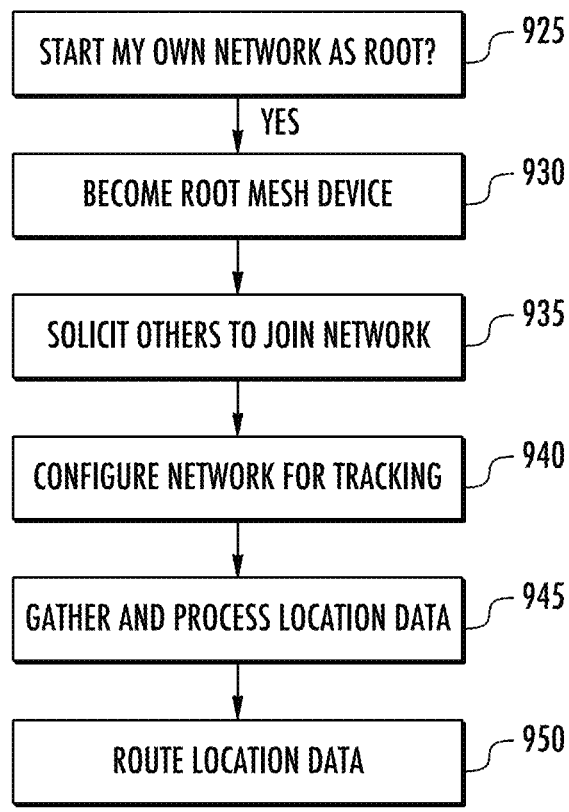
FIG. 9B is a flowchart illustrating operations for forming a mobile mesh network in accordance with some embodiments of the present inventive concept.

Referring now to FIG. 9B, steps in forming a mesh network in accordance with some embodiments of the present inventive concept will be discussed. It will be understood that, whether part a device is part of an existing network or not, the device can also choose to form a new network (block 925). An antenna device may choose to form a new network if it deems the area is insufficiently covered by other networks. Alternatively, the antenna device may determine that there could be a risk that an area may not be covered from either a mesh dissociating or vitally positioned devices within the mesh going out of range. As the owner of the mesh network, the antenna device is called the root mesh device (block 930). The root acts like a master of the network and it is largely in control of the network and how it is configured. The root device solicits other devices to join the network (block 935). The root device can either broadcast a message soliciting other devices to join, or alternatively, the root device knows existing devices in the area and queries them directly. As new devices announce themselves, the root device can invite new devices to join the network.

Given the capabilities of the network and the needs to do localization, the root device can configure the mesh appropriately (block 940). Part of the configuration may involve determining precisely which tracking methods to use. UWB examples include TDOA, ranging, AoA, or any combination thereof, however, embodiments are not limited thereto. Configuring the network includes how to route raw data back to a centralized processor as well. Routing of the raw data is determined by the root device (block 945). Depending on the processing availability and who actually needs the data, different data could be routed to different locations. For example, all data may be sent to the root device to do the location calculations. Alternatively, all data could be sent off site to a cloud based server which performs the location calculations. In some embodiments, some devices may not have the capability to send their data to the processing device, for instance they do not have an internet connection, and so their data is routed through other devices that do have the necessary capability.

Once locations are calculated, the location data is routed appropriately (block 950). Location data can be stored locally within the mesh, or it can be stored semi-locally within communication range of the mesh but not in the mesh, or lastly, it can be stored on an off site server. Location data can be stored in different locations depending on what the needs for storage are for the tag. For example, if there is only a need to know the last known location of the tag, then there may not be large storage needs for location data and it may only need to be stored locally or semi-locally.

Figure 10:
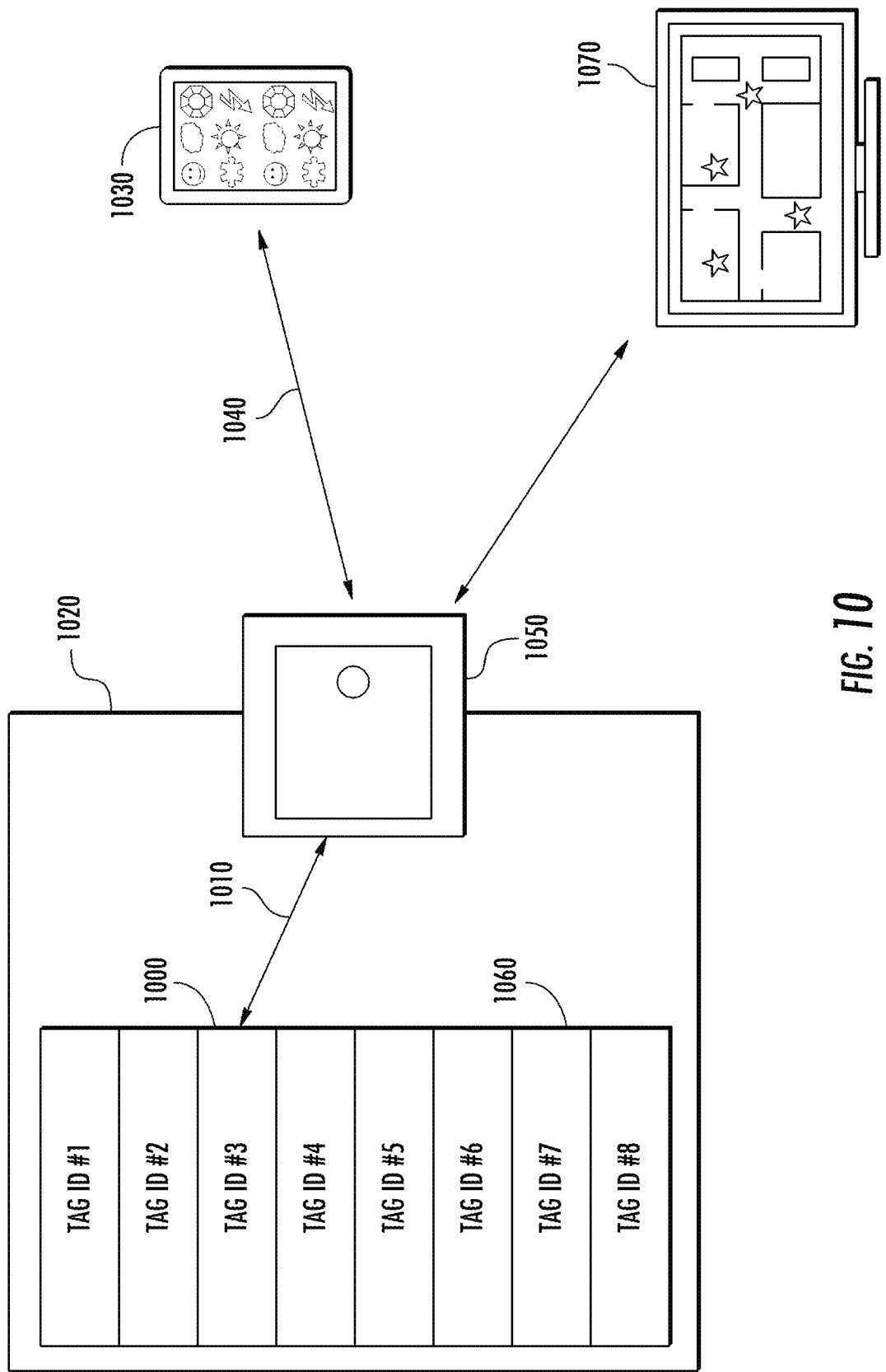
FIG. 10 is a block diagram including a data service and mobile device in accordance with some embodiments of the present inventive concept.

As embodiments of the present inventive concept involve personal devices and data, security and should be considered. Referring now to FIG. 10, a diagram illustrating security in accordance with some embodiments of the present inventive concept will be discussed. As illustrated, tag location data 1000 may be stored within a data server 1020. Queries 1040 for tag locations may be made to the data server 1020. The data server 1020 includes a security gateway 1050 that restricts which requestors can see which tag data 1000. For example, a tag location 1000 may be only viewable to the owner of the tag. Therefore, any recipients requesting access to the tag's location would need to verify that they are the owners. As in the case of a cell phone 1030 that can act as an antenna device, the cell phone could be the owner of a group of tags. When these tag locations need to be queried, the cell phone makes a request to the data server through the gateway 1050. If the cell phone 1030 is identified as the tag owner, the data server 1020 makes an internal request 1010 to get the tag data 1000. In some embodiments, an additional display device 1070 that is registered to the same account as device 1030 could be used to access and view the location information. This device could also be a third party account that has been given access by the account owning the tag location data 1000 associated with cell phone 1030. Note that there are standard methods of encryption and data access available that could be employed as well. FIG. 10 illustrates an example method and details have been intentionally generalized, thus, embodiments should not be limited thereto.

A tag data server could be located within the mesh network or close to it. The tag server could also be temporal in nature, only existing as long as needed to obtain tag data for a particular application. The location of the tag data server could be established during configuration of the network as discussed with respect to blocks 910 and 940 in FIG. 9. In some embodiments, the tag server could be predetermined outside of configuration and decided a-priori. In still further embodiments, the tag could include an address of where to store its location data when communicating to the mesh network. The owner of the tag would have that address as well and know where to find the tag.

In some embodiments, location data can be routed directly to an antenna device without the need of a tag data server. During the process of joining the mesh network, antenna devices can also list out their ownership of tags to the mesh network. The mesh network maintains a list of which antenna device owns which tag. During the step of routing location data discussed with respect to block 915 of FIG. 9, the location data of the tag can be sent directly to the antenna device owner instead of being stored within a data server.

Figure 11:
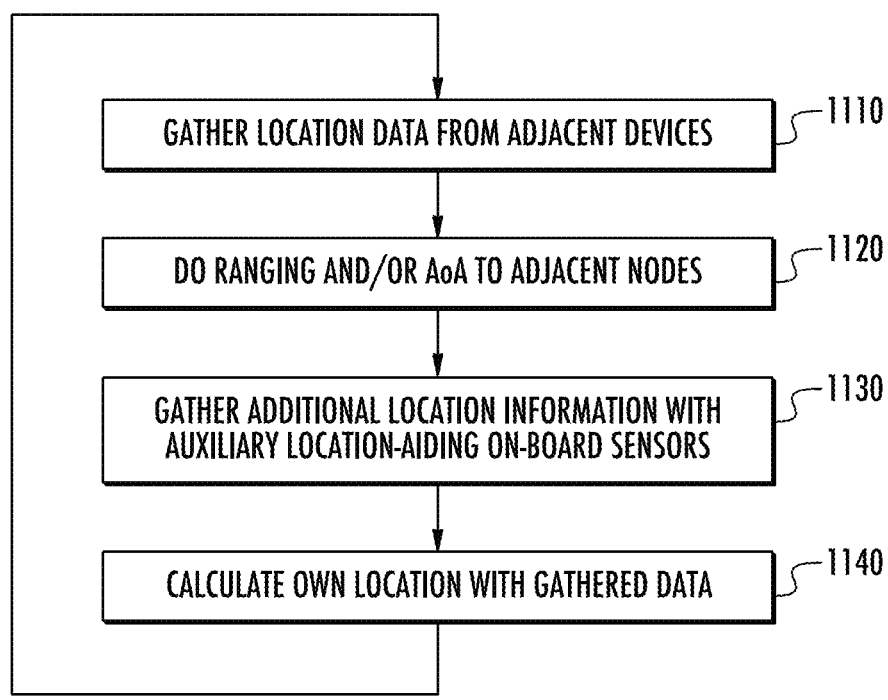
FIG. 11 is a flowchart illustrating operations for continually refining the location of a mobile antenna in accordance with some embodiments of the present inventive concept.

As part of the localization calculation, the knowledge of where the mobile antenna devices are is important to know. In order to determine the location of tags, the solution must also know the location of the surrounding antenna devices that participate in the location calculation. If antenna devices are mobile, the challenge then becomes to determine the location of the mobile antenna devices in addition to calculating the tag locations. Referring now to FIG. 11, operations for continually refining the location of a mobile antenna in accordance with some embodiments of the present inventive concept will be discussed. In embodiments discussed herein, the mobile antenna itself calculates its own location. However, in some embodiments, the location can be calculated by a different device.

As illustrated in FIG. 11, operations begins at block 1110 by gathering location data from adjacent devices. Some adjacent devices may be stationary so their location is likely known with a high degree of accuracy, but other mobile devices may not know their own location as well. It may not be sufficient just to merely collect the location data or raw location data without providing information as to the relatively reliability of the data itself. In the process of collecting the location data of mobile devices, additional parameters can be included that provide information regarding the accuracy and reliability of the location. For example, there could be a timestamp that refers to the point in time that the measurement was made. Additionally, there could be an accuracy parameter that describes the relative accuracy of the location. A location calculated from GPS may have significantly more error compared to a location determined by a UWB network, for example.

Operations proceed to block 1120 by performing UWB type RF transmission to either do ranging, TDOA, and/or AoA with adjacent nodes. While ranging and AoA can be accomplished directly by the antenna device communicating with another device in range, TDOA localization requires synchronization of clocks and gathering of additional timestamp data form surrounding antenna devices.

Additional auxiliary location-aiding sensors are used to aid in localization (block 1130). For example, inertial measurement units can be used as part of a dead reckoning solution. GPS and/or differential GPS can further help aid in determining location. Though traditional GPS may not have accuracy of 5.0 meters or so, GPS does provide an absolute location. This is compared to a mobile antenna network that can provide high accuracy proximate location, but without the knowledge of an absolute location, the subsequent location calculations will drift from the absolute location. Further sensors such as NFC, Wi-Fi, or Bluetooth can all be used either as proximity sensors or as rough distance sensors using received signal strength. Additionally, magnetometers can be used to determine orientation with the Earth's magnetic poles, and pressure sensors can be used to determine the device's altitude by measuring the atmospheric pressure. With the collection of both UWB based data and on-board sensors, the calculation of the updated position of the antenna device is performed (block 1140). Additional output parameters could include the timestamp at which point the location was determined and the accuracy of the calculated location, itself.

Operations repeat from block 1110 to perform a new location calculation. Location calculations could be arbitrarily fast or slow, such as 100 Hz or once every few minutes. In block 1130, though internal sensors to the antenna devices are specifically mentioned, external sensors could be used as well to help in location determination. For example, infrared emitters and receivers could be used. Camera object recognition of the antenna devices could be used as well. The antenna device could gather that data as part of block 1130 as well even though the sensors themselves are not co-located on the antenna device.

For mobile networks that wish to conserve RF broadband or reduce the total number of RF transmissions, methods that allow mobile and stationary devices to be silent for most of the time will be discussed. With TDOA methods, clock synchronization is important to convert the timestamp of the antenna device's local clock to a shared master time clock. This could be accomplished by continually sending out clock pings as discussed in, for example, U.S. Pat. No. 10,462,762 B2. However, for tags that do not send out transmissions very frequently, the antenna devices are needlessly performing clock synchronization during the time no tag transmissions occur.

Figure 12:
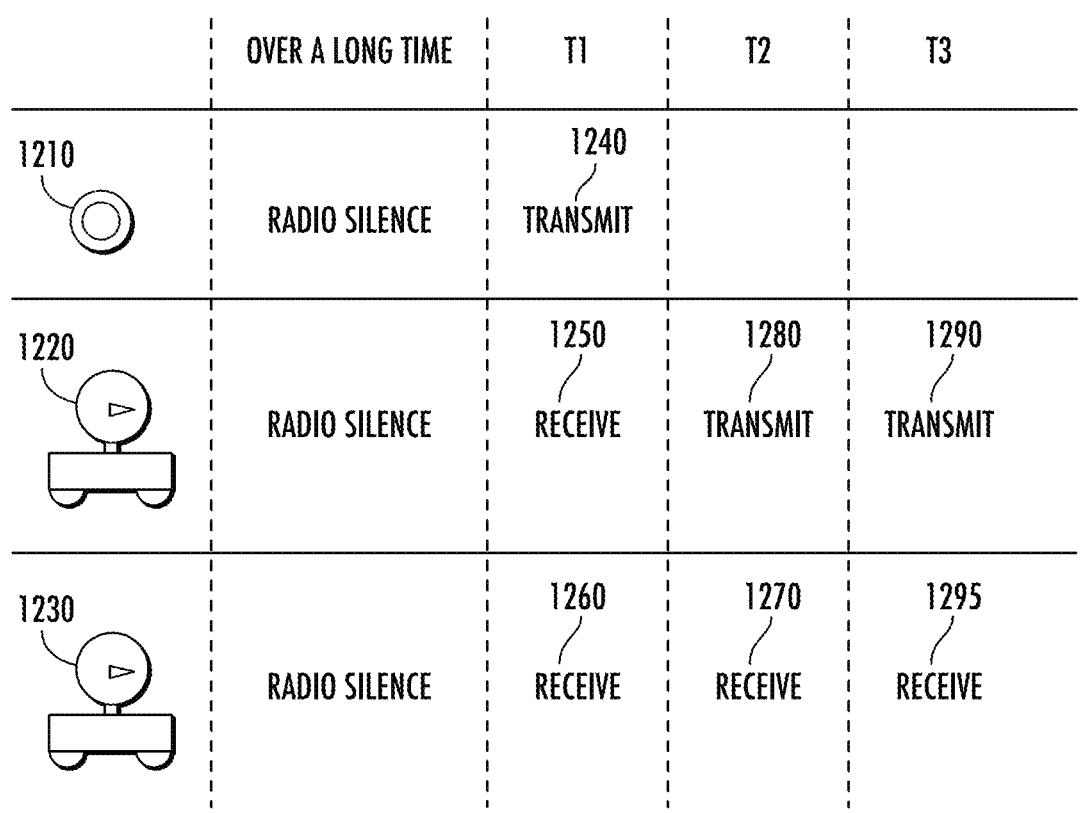
FIG. 12 is diagram illustrating antenna devices that remain silent and respond when a tag chirps in accordance with some embodiments of the present inventive concept.

Embodiments where the antenna devices remain silent and attempt to synchronize their clocks when the tag 1210 chirps (transmits) will be discussed with respect to FIG. 12. The chart of FIG. 12 illustrates transmission and reception activity of the tag 1210 and two antenna devices, 1220 and 1230. Time is displayed horizontally at the top. For the first period of time entitled "Over a long time" there is no transmission activity, neither by the tag 1210 nor by the two antenna devices 1220 and 1230. At time T1, there is a sudden transmission 1240 from the tag 1210. Both antenna devices 1220 and 1230 receive the tag transmission 1250 and 1260 and record the arrival timestamp. However, because it has been such a long time since the devices have communicated, the clocks of 1220 and 1230 are not synchronized. In order to synchronize their clocks, antenna device 1220 sends out two quick transmissions 1280 and 1290 at time T2 and T3, respectively. Antenna device receives 1220's two transmissions 1270 and 1295, respectively. By recording the arrival and departure timestamps of these two transmissions, 1280 and 1290, it is possible to synchronize the two clocks. In so doing, the reception 1260 timestamp from the tag 1210 can be converted into antenna devices 1220 clock units. Clocks can remain sufficiently synchronized for some period of time. When transmission 1240 is received by devices 1220 and 1230, the receiving devices can each independently determine if they are sufficiently synchronized with each other or other devices to perform the transformation of the arrival times into a common clock. If so, the devices can choose to skip the synchronization steps.

While some of these embodiments describe a tag tracking solution where the tag remains mostly stationary, the present inventive concept may also be useful with non-stationary tags as well. Many of the embodiments discussed herein provide methods and systems where moving tags can be tracked within a mobile and semi-mobile network under the current description.

Figure 13:
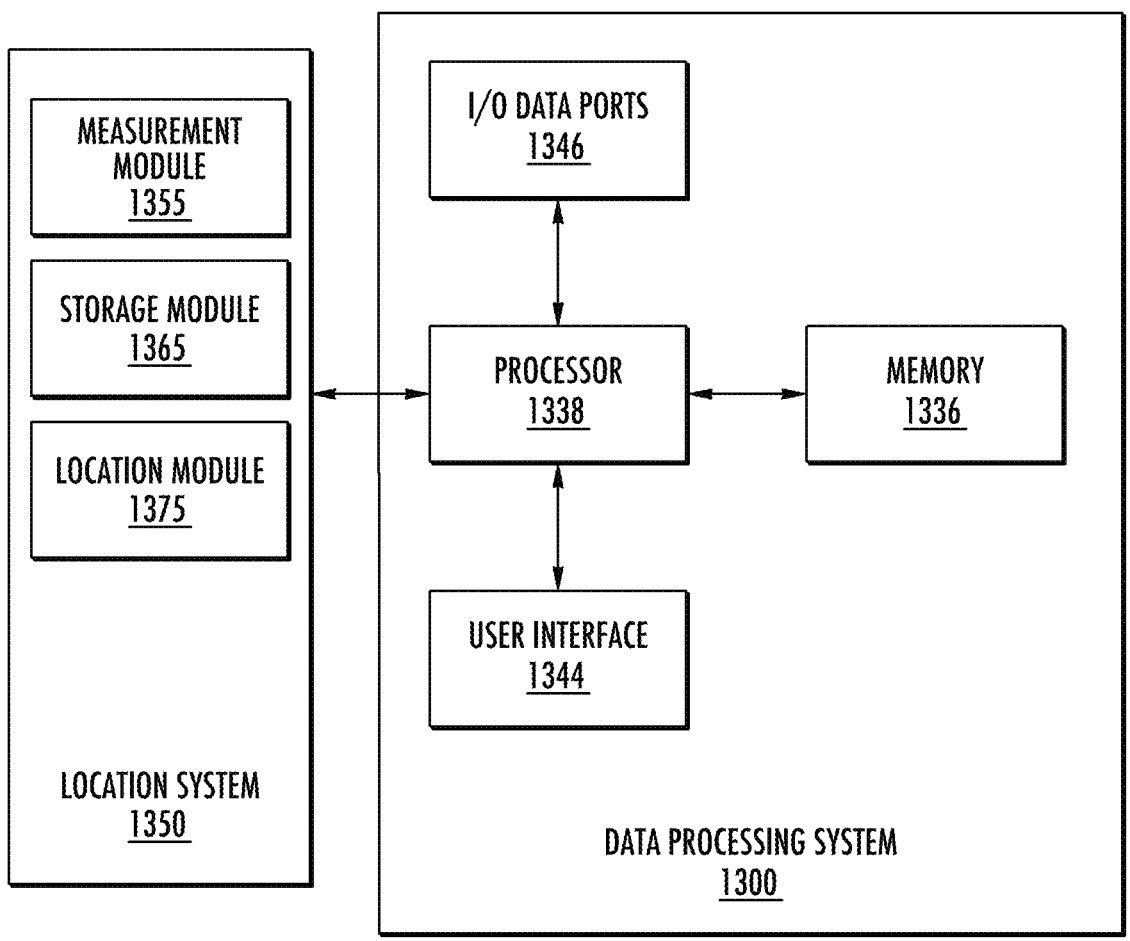
FIG. 13 is a block diagram of a data processing system that may be used in accordance with some embodiments of the present inventive concept.

Embodiments of the present inventive concept manipulate data to calculate various parameters. Accordingly, some sort of data processing is needed to create and store the data. FIG. 13 is a block diagram of an example of a data processing system 1300 suitable for use in the systems in accordance with embodiments of the present inventive concept. The data processing may take place in any of the devices (or all of the devices) in the system without departing from the scope of the present inventive concept. As illustrated in FIG. 13, the data processing system 1300 includes a user interface 1344 such as a keyboard, keypad, touchpad, voice activation circuit, display or the like, I/O data ports 1346 and a memory 1336 that communicates with a processor 1338. The I/O data ports 1346 can be used to transfer information between the data processing system 1300 and another computer system or a network. These components may be conventional components, such as those used in many conventional data processing systems, which may be configured to operate as described herein.

As further illustrated in FIG. 13, the data processing system communicates with a location system 1350 in accordance with some embodiments discussed herein. The location system 1350 includes a measurement module 1355; a storage module 1365 and a location module 1375. It will be understood that these modules are provide as examples only and, therefore, do not limit embodiments of the present inventive concept. These modules may be combined or split into more than three modules to perform aspects of the present inventive concept without departing from the scope of the present inventive concept.

The aforementioned flow logic and/or methods show the functionality and operation of various services and applications described herein. If embodied in software, each block may represent a module, segment, or portion of code that includes program instructions to implement the specified logical function(s). The program instructions may be embodied in the form of source code that includes human-readable statements written in a programming language or machine code that includes numerical instructions recognizable by a suitable execution system such as a processor in a computer system or other system. The machine code may be converted from the source code, etc. Other suitable types of code include compiled code, interpreted code, executable code, static code, dynamic code, object-oriented code, visual code, and the like. The examples are not limited in this context.

If embodied in hardware, each block may represent a circuit or a number of interconnected circuits to implement the specified logical function(s). A circuit can include any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Qualcomm® Snapdragon®; Intel® Celeron®, Core (2) Duo®, Core i3, Core i5, Core i7, Itanium®, Pentium®, Xeon®, Atom® and XScale® processors; and similar processors. Other types of multi-core processors and other multi-processor architectures may also be employed as part of the circuitry. According to some examples, circuitry may also include an application specific integrated circuit (ASIC) or a field programmable gate array (FPGA), and modules may be implemented as hardware elements of the ASIC or the FPGA. Further, embodiments may be provided in the form of a chip, chipset or package.

Although the aforementioned flow logic and/or methods each show a specific order of execution, it is understood that the order of execution may differ from that which is depicted. Also, operations shown in succession in the flow-charts may be able to be executed concurrently or with partial concurrence. Further, in some embodiments, one or more of the operations may be skipped or omitted. In addition, any number of counters, state variables, warning semaphores, or messages might be added to the logical flows or methods described herein, for purposes of enhanced utility, accounting, performance measurement, or providing troubleshooting aids, etc. It is understood that all such variations are within the scope of the present disclosure. Moreover, not all operations illustrated in a flow logic or method may be required for a novel implementation.

Where any operation or component discussed herein is implemented in the form of software, any one of a number of programming languages may be employed such as, for example, C, C++, C#, Objective C, Java, Javascript, Perl, PHP, Visual Basic, Python, Ruby. Delphi, Flash, or other programming languages. Software components are stored in a memory and are executable by a processor. In this respect, the term "executable" means a program file that is in a form that can ultimately be run by a processor. Examples of executable programs may be, for example, a compiled program that can be translated into machine code in a format that can be loaded into a random access portion of a memory and run by a processor, source code that may be expressed in proper format such as object code that is capable of being loaded into a random access portion of a memory and executed by a processor, or source code that may be interpreted by another executable program to generate instructions in a random access portion of a memory to be executed by a processor, etc. An executable program may be stored in any portion or component of a memory. In the context of the present disclosure, a "computer-readable medium" can be any medium (e.g., memory) that can contain, store, or maintain the logic or application described herein for use by or in connection with the instruction execution system.

A memory is defined herein as an article of manufacture and including volatile and/or non-volatile memory, removable and/or non-removable memory, erasable and/or non-erasable memory, writeable and/or re-writeable memory, and so forth. Volatile components are those that do not retain data values upon loss of power. Nonvolatile components are those that retain data upon a loss of power. Thus, a memory may include, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may include, for example, static random access memory (SRAM), dynamic random access memory (DRAM), or magnetic random access memory (MRAM) and other such devices. The ROM may include, for example, a programmable read-only memory (PROM), an erasable programmable read-only memory (EPROM), an electrically erasable programmable read-only memory (EEPROM), or other like memory device.

The devices described herein may include multiple processors and multiple memories that operate in parallel processing circuits, respectively. In such a case, a local interface, such as a communication bus, may facilitate communication between any two of the multiple processors, between any processor and any of the memories, or between any two of the memories, etc. A local interface may include additional systems designed to coordinate this communication, including, for example, performing load balancing. A processor may be of electrical or of some other available construction.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It should be emphasized that the above-described embodiments of the present disclosure are merely possible examples of implementations set forth for a clear understanding of the principles of the disclosure. It is, of course, not possible to describe every conceivable combination of components and/or methodologies, but one of ordinary skill in the art may recognize that many further combinations and permutations are possible That is, many variations and modifications may be made to the above-described embodiment(s) without departing substantially from the spirit and principles of the disclosure. All such modifications and That which is claimed is:

1. A system for determining location of tags in an environment, the system comprising:
   at least one mobile antenna that moves around the environment, wherein an absolute location associated with the at least one mobile antenna is known and wherein the at least one mobile antenna sends and receives messages including at least one of time of arrival, time of departure, signal strength and angle of arrival;
   a measurement module that performs distance measurements between the at least one mobile antenna and at least one tag in the environment to obtain at least, the distance measurements being associated with at least two locations of the at least one mobile antenna;
   a storage module that records the distance measurements at the at least two locations and the at least two locations;
   a location module that computes a location of each of the at least one tags based on the recorded distance measurements at the at least two locations and the recorded at least two locations of the mobile antenna; and
   at least one camera and wherein the location module processes images or videos obtained by the at least one camera to deduce the location of the at least one mobile antenna,
   wherein an orientation of one of the mobile antennas is determined using angle of arrival measurements related to other fixed or mobile antenna devices; and
   wherein the location module detects a mobile antenna when it enters a defined environment and forms an ad hoc network with the mobile antenna entering the defined environment and other mobile antennas and stationary antennas already within in the defined environment and wherein the ad hoc network performs cooperative localization of tags.

2. The system of claim 1, wherein a fixed or mobile antenna device knows its orientation and wherein the location module performs angle of arrival measurements between known orientation and the one of the mobile antennas to determine an orientation of the one of the mobile antennas.

3. The system of claim 1, wherein the orientation is extended into three-dimensional (3D) space.

4. The system of claim 3, wherein locations of the fixed and mobile antennas are known.

5. The system of claim 1, wherein the one of the mobile antennas and the other fixed or mobile antenna devices are portable electronic devices.

6. The system of claim 5:
   wherein the one of the mobile antennas cannot communicate with the at least one tag and the other fixed or mobile antenna device can communicate with the at least one tag;
   wherein the device that can communicate with the at least one tag performs distance ranging measurements, determines an angle of arrival of an incoming radio frequency (RF) signal from the at least one tag; and
   wherein the location module determines a relative location of the at least one tag to the one of the mobile antennas based on information received by the fixed or mobile antenna device the measurements.

7. The system of claim 6, wherein the mobile antennas include an electronic display thereon illustrating a graphic pointing to a direction of the at least one tag.

8. The system of claim 1, wherein the at least one mobile antennas flow in and out of the environment, the environment being specifically defined.

9. The system of claim 1, further comprising a tag server and wherein the mobile antennas are each associated with a specific tag, wherein the tag server receives a request from the mobile antennas for a location of associated tags.

10. The system of claim 9, wherein the tag server sends the requested location if the tag server has the requested location and instructs another antenna within range to send the requested location.

11. The system of claim 1, wherein the location module forms a dynamic mesh.

12. The system of claim 11, further comprising a root master device to manage behavior of the mesh.

13. The system of claim 11, wherein the mesh:
   receives announcements from devices in the environment;
   accepts and/or denies requests to join the mesh;
   issues commands to devices in the environment;
   sends data provided by devices through a network; and
   allows devices to leave the network.

14. The system of claim 13, wherein the data provided by devices includes camera images, IMU, magnetometers and/or RFID signals.

15. The system of claim 13, wherein allowing the devices to leave the network occurs when the device is out of communication range of the mesh.

16. The system of claim 15:
   wherein the system includes at least one tag and at least two antenna devices and the antenna devices remain silent and respond to a ping sent by the tag;
   wherein the antenna devices receive the ping sent by the tag and record an arrival time of the ping;
   wherein the antennas devices transmit a clock synchronization message after receiving the ping and record departure times thereof;
   wherein clocks are synchronized based on the recorded arrival and departure times; and
   wherein a universal master clock timestamp is created from the recorded arrival times.

17. The system of claim 1, wherein antennas devices go into low power mode or sleep mode to conserve power when the antenna devices are not actively listening or transmitting.

18. The system of claim 1, wherein the at least one tag is not stationary when location calculation is performed.

* * * * *